Patented Sept. 27, 1938

2,131,259

UNITED STATES PATENT OFFICE 2,131,259

PREPARATION OF PENTACHLORO-PHENOL

Wesley C. Stoesser, Midland, Mich., assignor to The Dow Chemical Company, Midland, Mich., a corporation of Michigan No Drawing. Application April 28, 1937, Serial No. 139,585

4 Claims. (Cl. 260—623)

This invention is concerned with a process for the preparation of pentachloro-phenol.

In the previously described processes for the chlorination of phenol to form pentachloro-phenol, it has been customary to employ as catalysts such materials as antimony pentachloride, iodine, ferric chloride, etc. Barral, Bulletin de la Societe Chimique (3) 23, 822 ff. (1900), states that, after an extended search, anhydrous ferric chloride is the most satisfactory catalyst he has found. Even when employing his preferred catalyst, however, he reports that the chlorination of phenol to pentachloro-phenol results in the formation of appreciable quantities of viscous materials, especially at temperatures above 135–140° C. The pentachloro-phenol obtained by Barral was discolored and he found it expedient to bleach the product in an alkaline medium with sodium peroxide in order to obtain light colored material.

I have attempted to produce pentachloro-phenol by the direct chlorination of phenol, with and without the aid of solvents, using, among others, the catalysts described by Barral. This work was carried out both in iron and in glass equipment. In all cases, when chlorination of phenol was carried to the pentachloro stage, considerable quantities of non-phenolic, alkali-insoluble material were produced. The amount of such alkali-insoluble product varied widely, from about 10 per cent to as much as 90 per cent of the total weight of product obtained. The products were almost invariably badly discolored.

It is among the objects of this invention to provide a process whereby pentachloro-phenol may be produced in high yield by the direct chlorination of phenol. Another object is to provide a process whereby phenol and chloro-phenols below the pentachloro- stage may be chlorinated in iron equipment without the concurrent formation of large quantities of alkali-insoluble products.

I have now discovered that pentachloro-phenol, unaccompanied by more than traces of alkali-insoluble material, can be obtained in high yield by chlorinating phenol or an intermediate chloro-phenol in the presence of aluminum chloride. This reaction may be carried out at temperatures gradually increasing up to about 190° C., such that the reaction mass remains molten throughout the chlorination, or it may be carried out by dissolving the phenol or partially chlorinated phenol in an inert solvent and maintaining the temperature of reaction above about 60° C. but below the boiling point of the solvent employed.

One way of practicing my invention comprises first chlorinating molten phenol to approximately the trichloro- stage, then dissolving the intermediate product in an inert solvent, adding a small amount of anhydrous aluminum chloride, and continuing the chlorination until the pentachloro-phenol has been formed. When the chlorination is complete, the reaction product is cooled and the solution filtered to remove crystallized pentachloro-phenol. The filtrate is mixed with sufficient dilute aqueous alkali to dissolve any chloro-phenols therein contained and the solvent is recovered by steam distillation. The residual aqueous alkaline solution can then be filtered to remove insoluble matter and the clear filtrate acidified to recover the remaining pentachloro-phenol. Alternatively, the phenol may be admixed directly with the solvent and catalyst before any chlorination thereof is carried out.

Suitable solvents for the reaction are liquid chlorinated aliphatic hydrocarbons, and especially those having boiling points above about 60° C., e. g. ethylene chloride, sym-tetrachloro-ethane, trichloro-ethane, carbon tetrachloride, or propylene chloride.

The amount of catalyst which I prefer to employ is between about 0.01 and about 0.04 mol of aluminum chloride (calculated as $AlCl_3$) per mol of phenol. This corresponds to between about 1.4 and about 5.7 per cent by weight of aluminum chloride based on the original weight of the phenol.

Other modifications of the procedure will become apparent from the following detailed examples, which illustrate the practice of my invention:—

*Example 1*

2 grams of aluminum chloride was dissolved in 94 grams (1 mol) of phenol, and chlorine bubbled thereinto over a period of about 10 hours, during which time the temperature of the reaction mixture was gradually increased up to about 190° C. When 5 mols of chlorine had been introduced, the chlorine flow was stopped, and the temperature of the mass was raised to 200° C., after which the product was poured out and allowed to cool. In this way there was obtained 259 grams of product melting from 178° to 187° C., mostly at or near the latter temperature. Over 98 per cent of the product was soluble in aqueous alkali.

*Example 2*

98.8 grams of trichloro-phenol (0.5 mol), having a freezing point of 65° C., was dissolved in 200 grams of ethylene chloride. To this solution was added 2 grams of aluminum chloride and the mixture was chlorinated at a temperature from 70° to 85° C. (measured in the liquid) until 2 equivalents (1 mol) of chlorine had been introduced. The reaction mixture was then allowed to cool and was filtered. There was obtained 98.8 grams of pentachloro-phenol melting from 180° to 186° C. This material was completely soluble in sodium hydroxide. The filtrate which had been separated from the pentachloro-phenol crystals was added to 200 cc. of 7.5 per cent sodium hydroxide and the ethylene chloride was removed from the mixture by steam distillation. The alkaline solution remaining in the still was filtered from the trace of insoluble material present, and the alkaline filtrate was acidified, whereupon 29.8 grams of additional pentachloro-phenol was obtained. The total yield of pentachloro-phenol was 128.4 grams or 96.5 per cent of the theoretical amount obtainable from the trichloro-phenol employed as a starting material.

Example 3

210 grams of symmetrical tetrachloro-ethane was substituted for the ethylene chloride employed as solvent in the preceding example. Chlorination was continued until approximately 1 mol of chlorine had been added. The reaction was complete in approximately 3 hours, the mixture was cooled, and the crystals obtained were removed from the mother liquor by filtration. These crystals, when dried, weighed 112.4 grams and had a melting point from 180° to 186° C. The filtrate was treated with dilute sodium hydroxide and steam distilled to remove the solvent. The alkaline solution was filtered and acidified, whereby there was recovered an additional 13.1 grams of pentachloro-phenol. The total yield of pentachloro-phenol was 125.5 grams or 94.3 per cent of theoretical. The residue from the last filtration consisted of 1.1 grams of alkali-insoluble material.

Example 4

1 mol (197.5 grams) of trichloro-phenol was mixed with 2.0 grams of aluminum chloride and subjected to chlorination without the use of a solvent, at a temperature increasing gradually from 120° to 190° C. until approximately 2 mols of chlorine had been added. There was obtained 259 grams of pentachloro-phenol melting between 167° and 186° C., principally between 180° and 186° C. This product was 99.6 per cent soluble in dilute sodium hydroxide, and contained 65.7 per cent of chlorine, as compared with the theoretical chlorine content for pentachloro-phenol of 66.6 per cent.

Example 5

In a manner analogous to that described in the preceding example, 1 mol of trichloro-phenol and 2 grams of aluminum chloride were chlorinated in a glass vessel at temperatures which were gradually increased from 100° to 190° C. Chlorination was discontinued when the product had a melting point of approximately 184° C. There was obtained a yield of 97.7 per cent of the theoretical amount of pentachloro-phenol, of which only 0.18 per cent was insoluble in alkali. The chlorine content of this product was 66.4 per cent.

Example 6

232 grams (1 mol) of a technical grade of tetrachloro-phenol containing appreciable amounts of iron was mixed with 1.5 grams of aluminum chloride and chlorinated in an iron vessel without employing any solvent. Chlorination was carried out at temperatures ranging upward from 120° to 195° C., as required, to keep the reaction mixture in a molten condition, until 1 mol of chlorine had been added. The product obtained was dark colored but melted from 160° to 192° C. and chiefly from 180° to 190° C. There was obtained 260 grams, or 98 per cent of the theoretical amount of pentachloro-phenol, of which 4.9 grams or approximately 1.9 per cent was insoluble in dilute sodium hydroxide.

It is evident from the foregoing examples that a very satisfactory grade of pentachloro-phenol can be obtained by the direct chlorination of phenol in the presence of aluminum chloride in either glass or iron equipment and with or without employing a solvent. In no case was the amount of alkali-insoluble material so great as to be objectionable in a technical product and in all cases this quantity was substantially less than that produced according to the processes described in the prior art.

Other modes of applying the principle of my invention may be used instead of those explained, change being made as regards the process herein disclosed, provided the step or steps stated by any of the following claims or the equivalent of such stated step or steps be employed.

I, therefore, particularly point out and distinctly claim as my invention:—

1. The process which comprises chlorinating phenol in the presence of aluminum chloride.

2. In a method of preparing pentachloro-phenol, the step which consists in chlorinating phenol in the presence of aluminum chloride until the melting point of the product is above about 180° C.

3. In a process for the preparation of pentachloro-phenol, the step which consists in chlorinating a material selected from the group consisting of phenol and the intermediate chloro-phenols in a liquid chlorinated aliphatic hydrocarbon having a boiling point above about 60° C., at a temperature above about 60° C. and not substantially above the boiling point of the solvent, in the presence of aluminum chloride.

4. In a process for the preparation of pentachloro-phenol, the step which consists in chlorinating a material selected from the group consisting of phenol and the intermediate chloro-phenols in the presence of between about 0.01 and about 0.04 mols of aluminum chloride ($AlCl_3$) per mol of phenolic compound.

WESLEY C. STOESSER.